US010616849B2

(12) United States Patent
Kim et al.

(10) Patent No.: US 10,616,849 B2
(45) Date of Patent: Apr. 7, 2020

(54) METHOD FOR REGISTERING HOME ROUTED ROAMING USER EQUIPMENT WITH IMS NETWORK

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Myungjune Youn, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/755,725

(22) PCT Filed: Aug. 17, 2016

(86) PCT No.: PCT/KR2016/009025
§ 371 (c)(1),
(2) Date: Feb. 27, 2018

(87) PCT Pub. No.: WO2017/039187
PCT Pub. Date: Mar. 9, 2017

(65) Prior Publication Data
US 2019/0028992 A1 Jan. 24, 2019

Related U.S. Application Data

(60) Provisional application No. 62/322,195, filed on Apr. 13, 2016, provisional application No. 62/210,999, filed on Aug. 28, 2015.

(51) Int. Cl.
*H04W 4/00* (2018.01)
*H04W 60/04* (2009.01)
(Continued)

(52) U.S. Cl.
CPC .............. *H04W 60/04* (2013.01); *H04L 12/28* (2013.01); *H04L 29/06* (2013.01); *H04W 8/06* (2013.01);
(Continued)

(58) Field of Classification Search
CPC ..... H04W 60/04; H04W 76/11; H04W 76/27; H04W 8/06; H04W 8/12; H04W 36/0061; H04W 36/0066; H04W 88/16
(Continued)

(56) References Cited

U.S. PATENT DOCUMENTS

2009/0047947 A1 2/2009 Giaretta et al.
2012/0084246 A1 4/2012 Zhou et al.
(Continued)

FOREIGN PATENT DOCUMENTS

EP 3343963 A1 7/2018
KR 10-2010-0074315 A 7/2010
(Continued)

OTHER PUBLICATIONS

LG Electronics, "Solution Proposal for Key Issue #3", SA WG2 Meeting #111, S2-153164, Chengdu, P.R. China, Oct. 19-23, 2015, pp. 1-3.
(Continued)

*Primary Examiner* — Huy C Ho
(74) *Attorney, Agent, or Firm* — Birch, Stewart, Kolasch & Birch, LLP

(57) ABSTRACT

One disclosure of the present specification provides a method for a proxy-call session control function (P-CSCF) of a home public land mobile network (H-PLMN) to register a roaming user equipment with an IP multimedia subsystem (IMS) network. The method may comprise the steps of: receiving an identifier of a visited public land mobile network (V-PLMN) in which a user equipment is roaming,
(Continued)

wherein the identifier of the V-PLMN is received in a state where packet data network (PDN) connection for the user equipment is established but the user equipment is not registered with the IMS network; receiving, from the user equipment, a REGISTER message for registration with the IMS network; adding the identifier of the V-PLMN to a header of the REGISTER message; and transmitting the REGISTER message to which the identifier of the V-PLMN is added to an Interrogating-CSCF (I-CSCF).

16 Claims, 14 Drawing Sheets

(51) Int. Cl.

| | | |
|---|---|---|
| *H04L 12/28* | (2006.01) | |
| *H04L 29/06* | (2006.01) | |
| *H04W 8/08* | (2009.01) | |
| *H04W 76/11* | (2018.01) | |
| *H04W 76/27* | (2018.01) | |
| *H04W 8/06* | (2009.01) | |
| *H04W 8/12* | (2009.01) | |
| *H04W 36/00* | (2009.01) | |
| *H04W 88/16* | (2009.01) | |

(52) U.S. Cl.
CPC .............. *H04W 8/08* (2013.01); *H04W 8/12* (2013.01); *H04W 36/0061* (2013.01); *H04W 36/0066* (2013.01); *H04W 76/11* (2018.02); *H04W 76/27* (2018.02); *H04W 88/16* (2013.01)

(58) Field of Classification Search
USPC ...................................................... 455/435.1
See application file for complete search history.

(56) References Cited

U.S. PATENT DOCUMENTS

| | | | |
|---|---|---|---|
| 2012/0134323 | A1 | 5/2012 | Perkuhn et al. |
| 2016/0021146 | A1* | 1/2016 | Mufti .................. H04L 65/1016 |
| | | | 370/328 |
| 2018/0310162 | A1 | 10/2018 | Kim et al. |

FOREIGN PATENT DOCUMENTS

| | | |
|---|---|---|
| WO | WO 2015/028083 A1 | 3/2015 |
| WO | WO 2017/082532 A1 | 5/2017 |

OTHER PUBLICATIONS

NTT Docomo, "Key Issue: Determination of VPLMN-ID at IMS entities in HPLMN", SA WG2 Meeting #110, S2-152384, Dubrovnik, Croatia, Jul. 6-10, 2015, pp. 1-3.

* cited by examiner

METHOD FOR REGISTERING HOME ROUTED ROAMING USER EQUIPMENT WITH IMS NETWORK

CROSS REFERENCE TO RELATED APPLICATIONS

This application is the National Phase of PCT International Application No. PCT/KR2016/009025, filed on Aug. 17, 2016, which claims priority under 35 U.S.C. 119(e) to U.S. Provisional Application No. 62/210,999, filed on Aug. 28, 2015 and 62/322,195, filed on Apr. 13, 2016, all of which are hereby expressly incorporated by reference into the present application.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that |

TABLE 1-continued

| REFERENCE POINT | DESCRIPTION |
| --- | --- |
| | provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |
| Rx | A reference point between PCRF and AF (Application Function), AF can be P-CSCF of IMS network |

Among the reference points shown in FIG. 1, S2a and S2b correspond to a Non-3GPP interface. S2a is a reference point that provides the user plane with the relevant control and mobility support between trusted Non-3GPP access and PDN GW. S2b is a reference point providing the user plane with the associated control and mobility support between the ePDG and the PDN GW.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 illustrates a connection process in a radio resource control (RRC) layer.

FIG. 5 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows a connection between an EPC and an IP multimedia subsystem (IMS).

Referring to FIG. 6, the EPC includes an MME 51, an S-GW 52, a P-GW 53*a* to be coupled to the IMS, a P-GW 53*b* to be coupled to the Internet, and a policy and charging rule function (PCRF) 58 to be coupled to the P-GW 53*a*.

A network technology which enables up to a wireless terminal to perform packet switching (PS) based on an Internet protocol (IP) is proposed to connect both wired/wireless terminals through all-IPs.

A network based on the IMS includes a call session control function (CSCF) for control signaling, registration, and cession processing and a session and interconnection border control function (IBCF) 62. The CSCF may include a proxy-CSCF (P-CSCF) 61 and an S-CSCF (Serving-CSCF) 63. In addition, the CSCF may include an interrogating-CSCF (I-CSCF). The P-CSCF 61 acts as a first access point for a user equipment (UE) in the IMS-based network. In addition, the S-CSCF 63 processes a session in the IMS network. That is, the S-SCSF 63 is an entity which is in charge of routing signaling, and routes the session in the IMS network. In addition, the I-CSCF acts as an access point with respect to another entity within the IMS network.

An IP-based session is controlled by a session initiation protocol (SIP) under the IMS. The SIP is a protocol for controlling the session. The SIP is a signaling protocol which specifies a procedure for finding locations by identifying UEs to be communicated, generating a multimedia service session between the UEs, and deleting and changing the generated session. The SIP uses an SIP uniform resource identifier (URI) similar to an e-mail address to distinguish each user, so that a service can be provided without being dependent on an Internet protocol (IP) address. The SIP message is a control message, but is transmitted between the UE and the IMS network through an EPC user plane.

Referring to FIG. 6, the first P-GW 53*a* of the EPC is coupled to the P-CSCF 61 of the IMS, the P-CSCF 61 is coupled to the IBCF 62, and the IBCF 62 is coupled to the S-CSCF 63.

In addition, the second P-GW 53*b* of the EPC is coupled to a network of the Internet service operator.

Hereinafter, an initial access procedure of the UE 10 is described.

According to the initial access procedure, the EPC may allocate a default bearer to the UE 10, and may register the UE 10. In addition, the UE 10 may be allocated an IP address to use an IMS network from the PGW 53, and may obtain an address of the P-CSCF 61 to register to an IMS network.

FIG. 7 is an exemplary signal flow diagram showing an initial access procedure of a UE.

Referring to FIG. 7, for an initial access, the UE 10 which has been powered on configures an RRC connection with the eNodeB 20 as described with reference to FIG. 5 (S101).

After the RRC connection with the eNodeB 20 is established, the UE 10 transmits an attach request message to the MME 51 (S103). A PDN connectivity request message may be included in the attach request message. In this case, the UE 10 may request for an address of the P-CSCF 61 by using a protocol configuration option (PCO) field.

The MME 51 performs an authentication and security setup procedure for the UE 10 in association with the HSS 54 (S105). In the authentication procedure, the MME 51 obtains an authentication vector for a subscriber from the HSS 54, and thereafter performs mutual authentication with respect to the UE 10 by using the authentication vector. When the authentication procedure is complete, the MME 51 establishes a security key for the message security setup between the UE 10 and the MME 51.

The MME 51 performs a location registration procedure to inform the HSS 54 that the UE 10 is located in a region managed by the MME 51, and receives a user profile (S107). The location registration procedure may be performed by using a diameter protocol on an S6a interface. In addition, the user profile received by the MME 51 may include an access point name (APN), a P-GW identifier, a quality of service (QoS) profile, or the like.

The MME 51 selects the P-GW 53, and transmits a create session request message to the selected P-GW 53 (S109). The create session request message may include the user profile and the PCO field requesting an address of the P-CSCF 61. The create session request message transmitted by the MME 51 may be delivered to the P-GW 53 via the S-GW 52.

The P-GW 53 allocates the IP of the UE 10, and selects an address list of the P-CSCFs 61 which can be used by the UE among a plurality of P-CSCFs 61 according to the PCO field. Optionally, the P-GW 53 transmits an 'indication of IP-CAN session establishment' message to the PCRF 58 (S111). In addition, the P-GW 53 receives an 'acknowledge of IP-CON session establishment' message from the PCRF 58 (S113). The 'acknowledge of IP-CON session establishment' message may include a policy of a service to be provided to the UE 10.

The P-GW 53 transmits a create session response message to the MME 51 (S115). The create session response message may include an IP allocated to the UE 10 and the address list of the P-CSCF 61. The create session response message transmitted by the P-GW 53 may be transmitted to the MME 51 via the S-GW 52.

The MME 51 transmits an attach accept message including an initial context setup request message to the eNodeB 20. In addition, the eNodeB 20 transmits to the UE an access accept message including an RRC connection reconfiguration message and an activate default EPS bearer context request message (S117).

In step S119, the UE 10 transmits an RRC connection reconfiguration complete message to the eNodeB 20 in response to reception of the RRC connection reconfiguration message (S119). The eNodeB 20 transmits an initial context setup response message to the MME 51 in response to reception of the initial context setup request message (S121).

The MME 51 transmits a modify bearer request message to the S-GW 52 in response to reception of the initial context setup response message (S123). The bearer modify request message may include an EPS bearer identifier, an eNodeB address, a handover indication, or the like. The S-GW 52 transmits a modify bearer response message to the MME 51 in response to reception of the modify bearer response message (S125).

Hereinafter, an IMS initial registration procedure of the UE 10 will be described.

FIG. 8 is an exemplary signal flow diagram showing an IMS initial registration procedure.

Referring to FIG. 8, the UE 10 transmits a register message requesting for a registration to the P-CSCF 61 (S201). The UE 10 may transmit a register message by using an address of the P-CSCF 61, which is identified through the activate default EPS bearer context request message.

The P-CSCF 61 delivers the register message received from the UE 10 to the I-CSCF 64 by using an address of the I-CSCF 64, which is obtained through a domain name system (DNS) query procedure (S203).

The I-CSCF 64 transmits a user authorization request (UAR) message to the HSS 54 (S205). Since there is no S-CSCF 63 allocated to the UE 10, the HSS 54 transmits to the I-CSCF 64 a user authorization answer (UAA) message including capability information of the UE 10 (S207). The capability information is information in which capability to be provided to the UE 10 is organized with an attribute value pair (AVP).

The I-CSCF 64 selects one S-CSCF 63 on the basis of the received capability information, and transmits a register message to the selected S-CSCF 63 (S209).

The S-CSCF 63 transmits a multimedia authentication request (MAR) message to the HSS 54 to request for authentication information regarding the UE 10 (S211). Since there is no authentication information regarding the UE 10 due to the IMS initial registration, the HSS 54 transmits a multimedia authentication answer (MAA) message for informing that the authentication information is required to the S-CSCF 63 (S213).

The S-CSCF 63 transmits a 401 unauthorized message for requesting for the authentication information to the UE 10 (S215). The 401 unauthorized message may include an authentication vector received from the HSS, a symmetric key designated by the S-CSCF 63, and an authentication algorithm. The 401 unauthorized message may be delivered to the UE 10 via the I-CSCF 64 and the P-CSCF 61.

The UE 10 generates authentication data by using the received authentication vector, symmetric key, and authentication algorithm, and transmits the register message including the generated authentication data to the P-CSCF 61 (S217). The P-CSCF 61 delivers the received register message to the I-CSCF 64 (S219).

The I-CSCF 64 transmits the UAR message to the HSS 54 (S221). Since the S-CSCF 63 allocated to the UE 10 exists, the HSS 54 transmits the UAA message including the identification information of the allocated S-CSCF 63 to the I-CSCF 64 since (S223). The I-CSCF 64 transmits the register message to the S-CSCF 63 (S225).

The S-CSCF 63 authenticates the UE 10 by comparing authentication data included in the register message and authentication information transmitted by the S-CSCF 63, and transmits a server assignment request (SAR) message to the HSS (S227). The HSS 54 transmits to the S-CSCF 63 a server assignment answer (SAA) message including a service profile for the UE 10 (S229).

The S-CSCF 63 transmits to the UE 10 a 200 OK message notifying that the registration is complete, thereby completing the registration procedure (S231). The 200 OK message may be delivered to the UE 100 via the I-CSCF 64 and the P-CSCF 61.

FIG. 9 is an exemplary diagram showing a roaming scheme of voice over LTE (VoLTE).

As can be seen with reference to FIG. 9, the roaming scheme of VoLTE includes a home routed (HR) scheme and a local breakout (LBO) scheme.

According to the LBO scheme. IMS signaling transmitted from a UE is delivered to an S-CSCF in a home PLMN (H-PLMN) via an S-GW/P-GW/P-CSCF in a visited public land mobile network (V-PLMN).

In the HR scheme, the IMS signaling is delivered to the S-CSCF after passing through a P-GW/P-CSCF in the H-PLMH via the S-GW in the V-PLMN.

FIG. 10 is an exemplary signal flow diagram showing an IMS registration procedure of a UE roamed to a visited network through an HR scheme.

Hereinafter, when the IMS registration procedure based on the HR scheme of the UE 10 roamed to the visited network through the HR scheme is described, the duplicated description of FIG. 8 will be omitted.

Referring to FIG. 10, the UE 10 roamed to a visited network (or V-PLMN) transmits a register message to the S-GW 52b of the visited network via an eNB. The S-GW 52b of the visited network transmits the received register message to the P-GW 53a of a home network, and the P-GW 53a transmits the received register message to the P-CSCF 61a (S301). That is, the UE 10 transmits the register message to not a control plane but a user plane.

The P-CSCF 61a subscribes a network identifier (or PLMN-ID) change notification to the PCRF 58a (S303). In this case, the PLMN-ID change notification may be subscribed through an Rx interface. The Rx interface is an interface for exchanging information between the P-CSCF 61a of an IMS network and the PCRF 58a of an EPC network.

The PCRF 58a configures the P-GW 53a to report the PLMN-ID change (S305). In addition, the P-GW 53a reports a PLMN-ID for the network (i.e., the V-PLMN) serving the UE 10 to the PCRF 58a on the basis of information obtained in the PDN setup process (S307). As the PLMN-ID change notification is subscribed for the first time, the PCRF 58a reports the PLMN-ID for the V-PLMN to the P-CSCF 61a (S309).

That is, entities of the home network acquire an identifier of the visited network (or VPLMN-ID) in an IMS registration procedure. The VPLMN-ID acquired in this manner may be used in charging, roaming registration restriction, or bear creation for an additional service, or the like.

The P-CSCF 61a adds the PLMN-ID to a P-visited-network-ID header of the register message, and delivers to the I-CSCF 64a the register message to which the PLMN-ID is added (S311).

In addition, a subsequent IMS registration procedure is performed in the same manner as described with reference to FIG. 8.

Meanwhile, when the network serving the UE 10 is changed due to a movement of the UE 10, the P-GW 53a of the home network may identify a change of the PLMN-ID. Upon identifying the change of the PLMN-ID, the P-GW 53a reports to the PCRF 58a an event occurrence based on the PLMN-ID change. Upon receiving the report of the event occurrence based on the PLMN-ID change, the PCRF 58a reports a new PLMN-ID to the P-CSCF 61a.

However, in order for IMS entities of a home network to acquire a PLMN-ID of a visited network in a state where the UE is roamed based on the HR scheme, as described above, it takes a long time to create an Rx interface by receiving a register message from the UE, to register a PLMN-ID change notification to the PCRF, and to receive a report for the PLMN-ID.

Therefore, there is a need for a solution which allows the IMS entities to more effectively acquire the PLMN-ID of the visited network in the state where the UE is roamed based on the HR scheme.

SUMMARY OF THE INVENTION

Accordingly, a disclosure of the present specification aims to provide a method which allows IP multimedia subsystem (IMS) entities of a home network to effectively acquire a public land mobile network (PLMN)-identifier (ID) of a visited network in a state where a user equipment (UE) is roamed based on a home routed (HR) scheme.

To achieve the above purpose, a disclosure of the present specification provides a method in which a proxy-call session control function (P-CSCF) of a home public land mobile network (H-PLMN) registers a roaming UE to an IMS network. The method may include: receiving an identifier of a visited public land mobile network (V-PLMN) to which the UE is roaming, wherein the identifier of the V-PLMN is received in a state where packet data network (PDN) connection for the UE is established but the UE is not registered to the IMS network; receiving a register message for registration to the IMS network from the UE; adding the identifier of the V-PLMN to a header of the register message: and transmitting the register message, to which the identifier of the V-PLMN is added, to an interrogating-CSCF (I-CSCF).

The receiving of the identifier of the V-PLMN may include: receiving a dummy IP packet from a PDN-gateway (P-GW); and extracting the identifier of the V-PLMN from the dummy IP packet.

The receiving of the identifier of the V-PLMN may include receiving the identifier of the V-PLMN from the PCRF by using an Rx reference point for transmitting/receiving a signal between the P-CSRF and a policy and charging rule function (PCRF).

The identifier of the V-PLMN may be received prior to the register message by the P-GW in a process in which the register message transmitted from the UE is received via a PDN-gateway (P-GW).

When it is determined that the register message is transmitted through a default bearer of the PDN connection, the P-GW may delay transmission of the register message and transmit an identifier of a V-PLMN in advance.

The identifier of the V-PLMN may be transmitted by being included in a dummy IP packet, and an indicator for a transmission scheme of the identification of the V-PLMN may be included in a header of the register message. In the adding of the identifier of the V-PLMN to the header of the register message, the identifier of the V-PLMN may be extracted from the dummy IP packet on the basis of the indicator, and the extracted identifier of the V-PLMN may be added to the header of the register message.

The identifier of the V-PLMN may be an identifier for a V-PLMN which is serving the UE at a time when the PDN connection is established.

The UE may be roaming to the V-PLMN on the basis of a home routed (HR) scheme by using an S8 reference point for transmitting/receiving a signal between a serving-gateway (S-GW) of the V-PLMN and a PDN-gateway (P-GW) of the H-PLMND.

To achieve the above purpose, another disclosure of the present specification provides a P-CSCF of an H-PLMN for registering a roaming UE to an IMS network. The P-CSCF may include: a transceiver; and a processor controlling the transceiver. The processor may be configured to: control the transceiver to receive an identifier of a V-PLMN to which the UE is roaming, wherein the identifier of the V-PLMN is received in a state where PDN connection for the UE is established but the UE is not registered to the IMS network; control the transceiver to receive a register message for registration to the IMS network from the UE; add the identifier of the V-PLMN to a header of the register message: and control the transceiver to transmit the register message, to which the identifier of the V-PLMN is added, to an I-CSCF.

According to a disclosure of the present specification, IP multimedia subsystem (IMS) entities of a home network can effectively acquire a PLMN-ID of a visited network in a state where a user equipment (UE) is roamed based on a home routed (HR) scheme.

DESCRIPTION OF EXEMPLARY EMBODIMENTS

Figure 1:
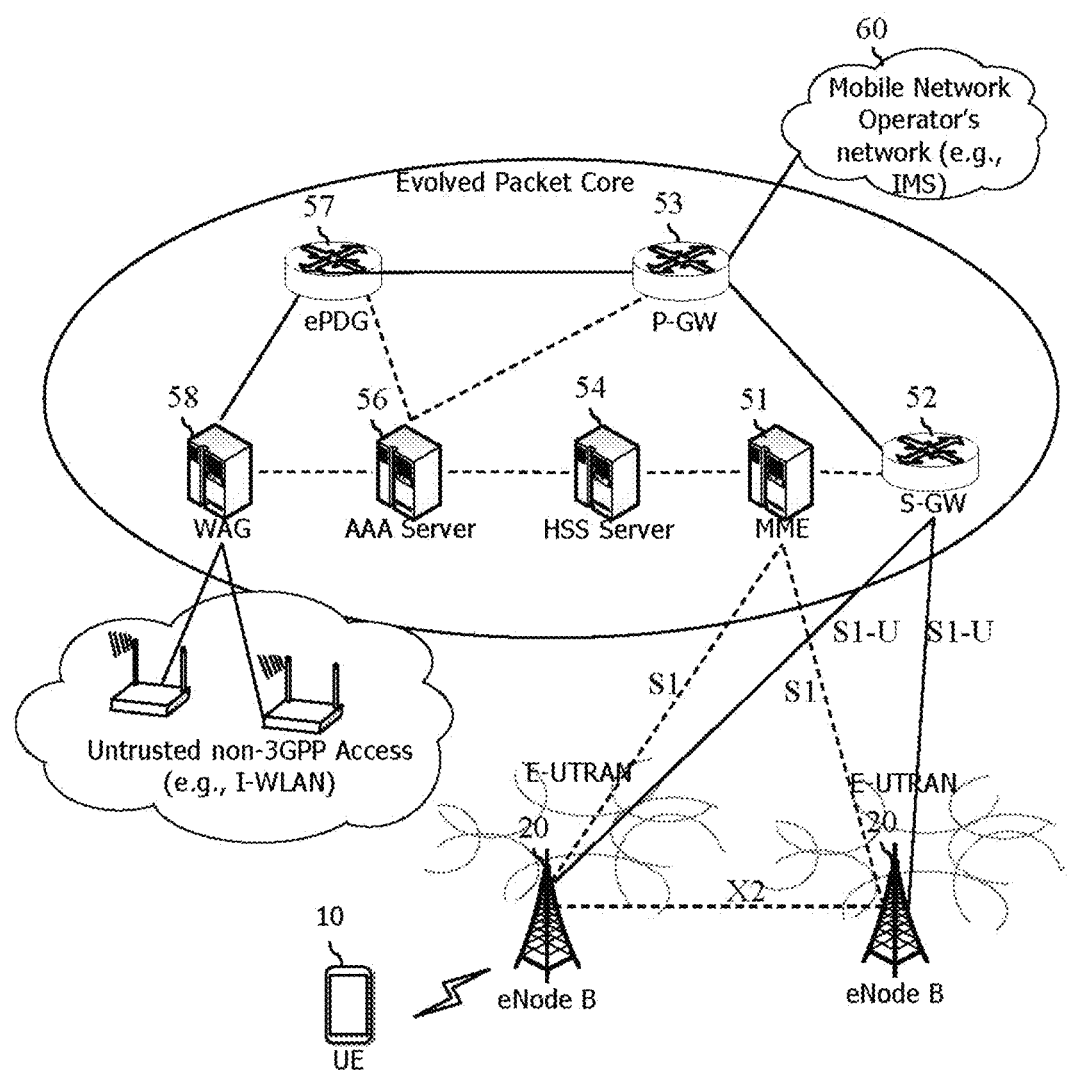
FIG. 1 shows the configuration of an evolved mobile communication network.
Figure 2:
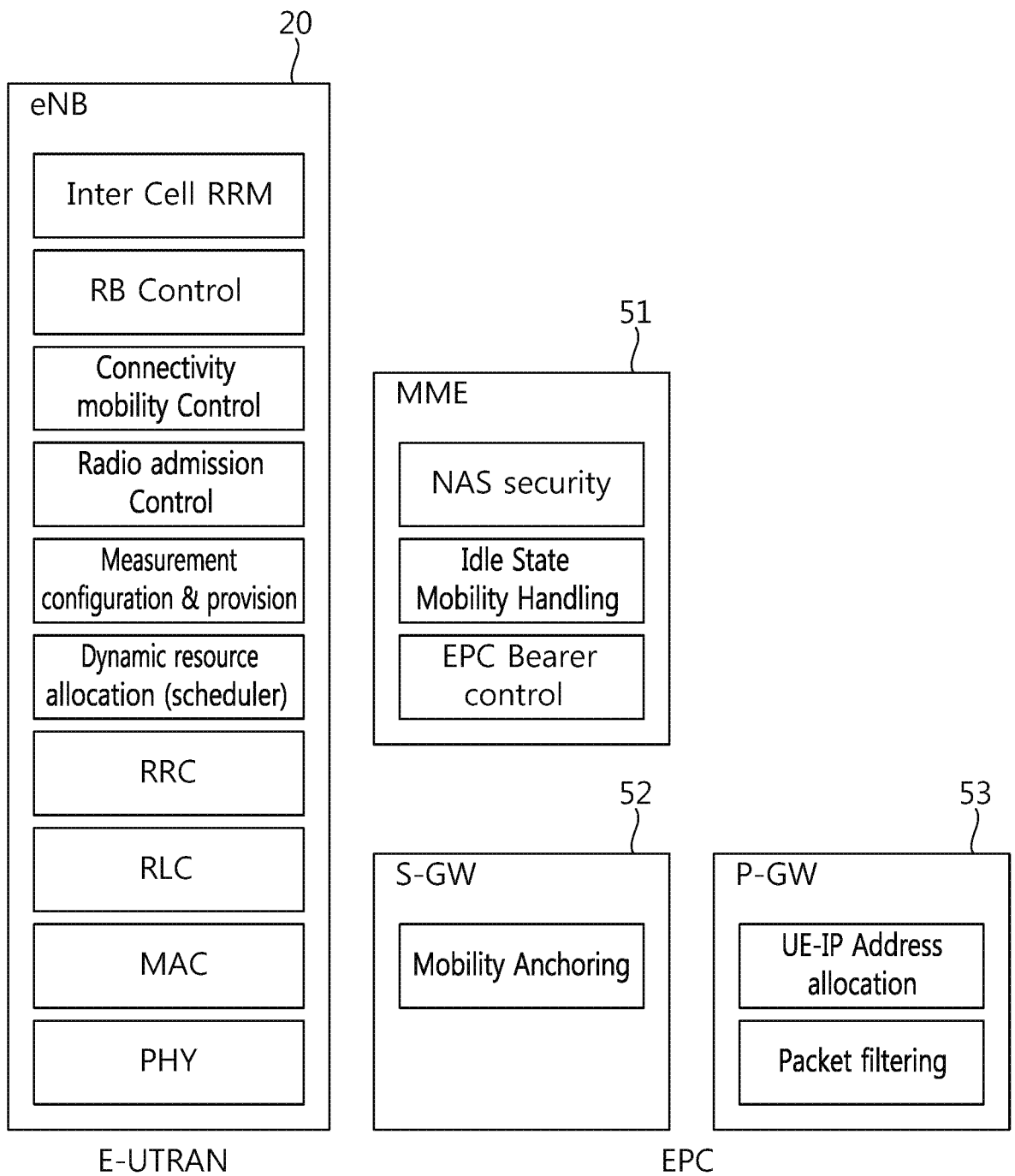
FIG. 2 is an exemplary diagram showing the architecture of a common E-UTRAN and a common EPC.
Figure 3:
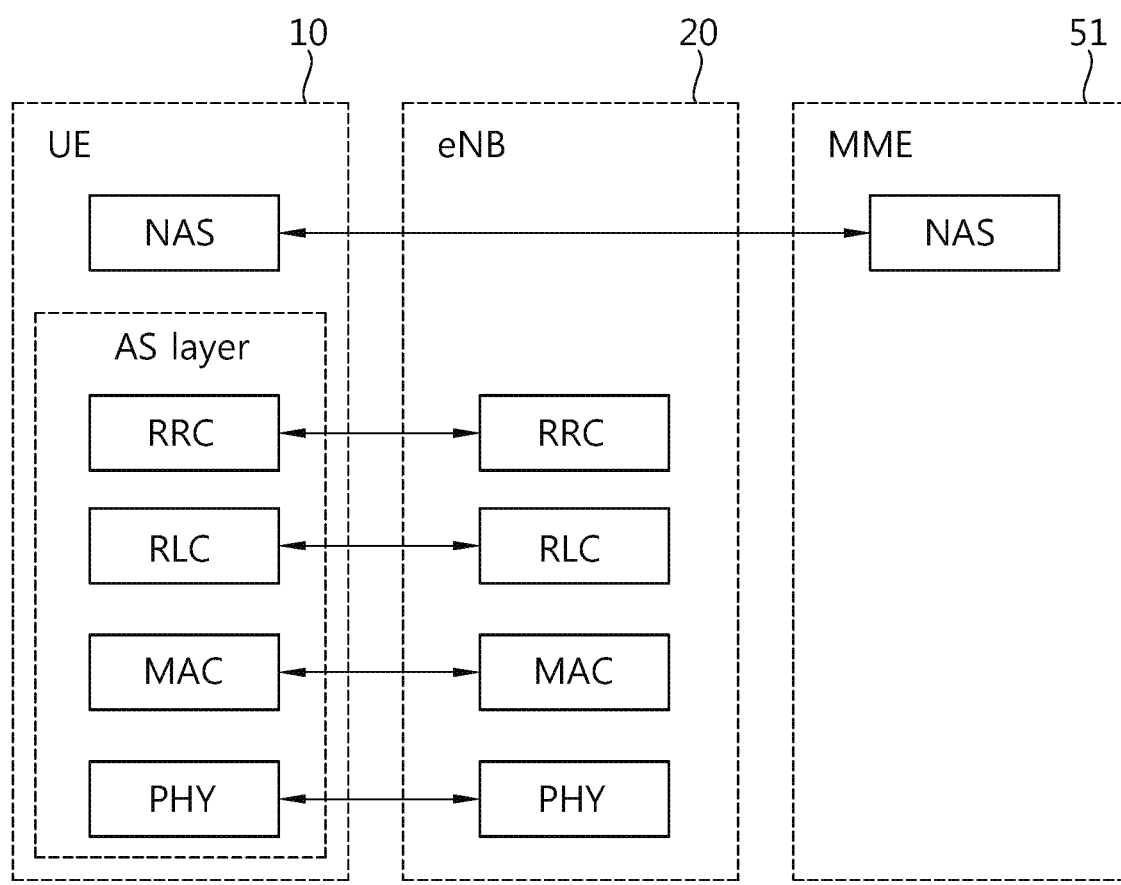
FIG. 3 is an exemplary diagram showing the structure of a radio interface protocol in a control plane between UE and an eNodeB
Figure 4:
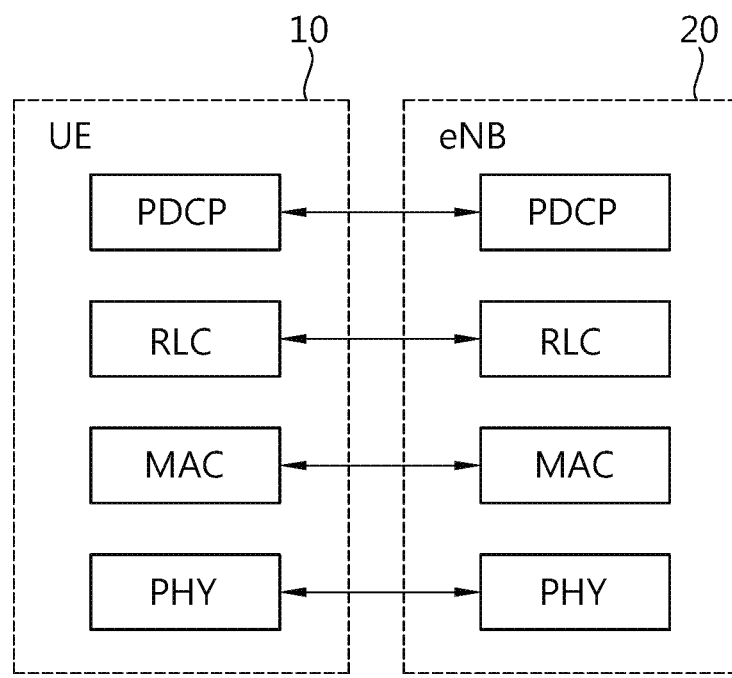
FIG. 4 is another exemplary diagram showing the structure of a radio interface protocol in a control plane between UE and an eNodeB.
Figure 5:
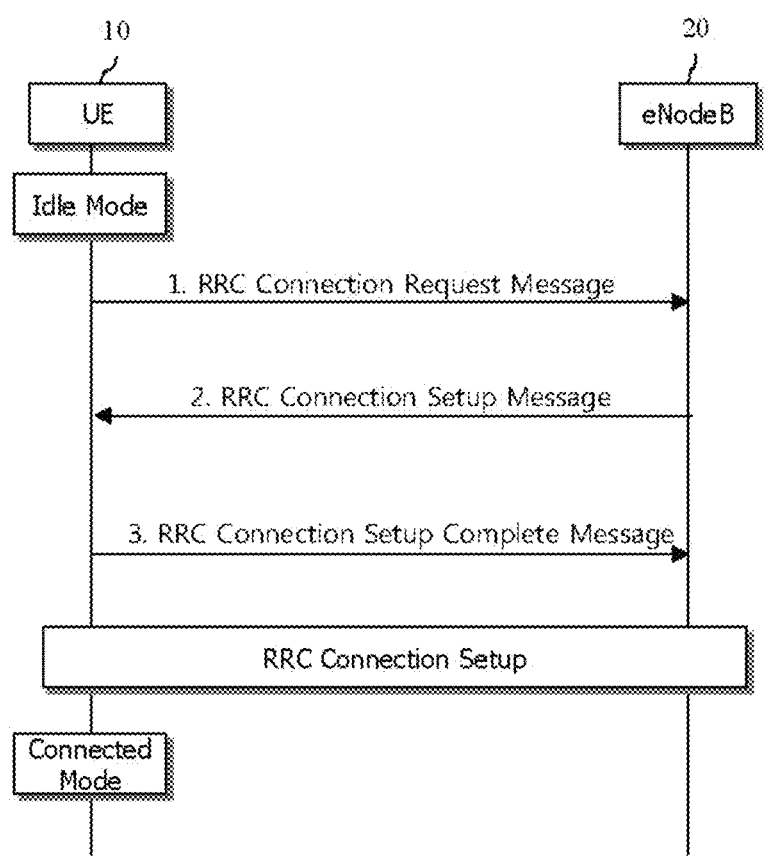
FIG. 5 illustrates a connection process in a radio resource control (RRC) layer.
Figure 6:
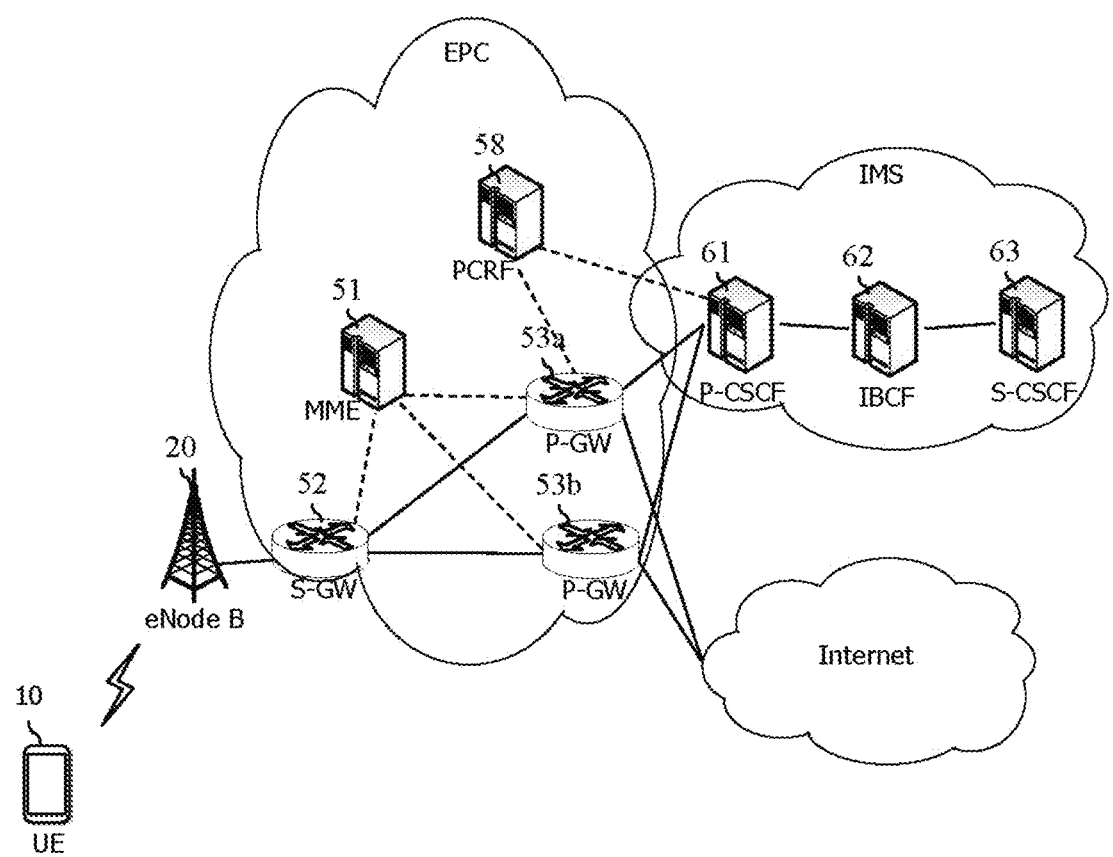
FIG. 6 shows a connection between an EPC and an IP multimedia subsystem (IMS).
Figure 7:
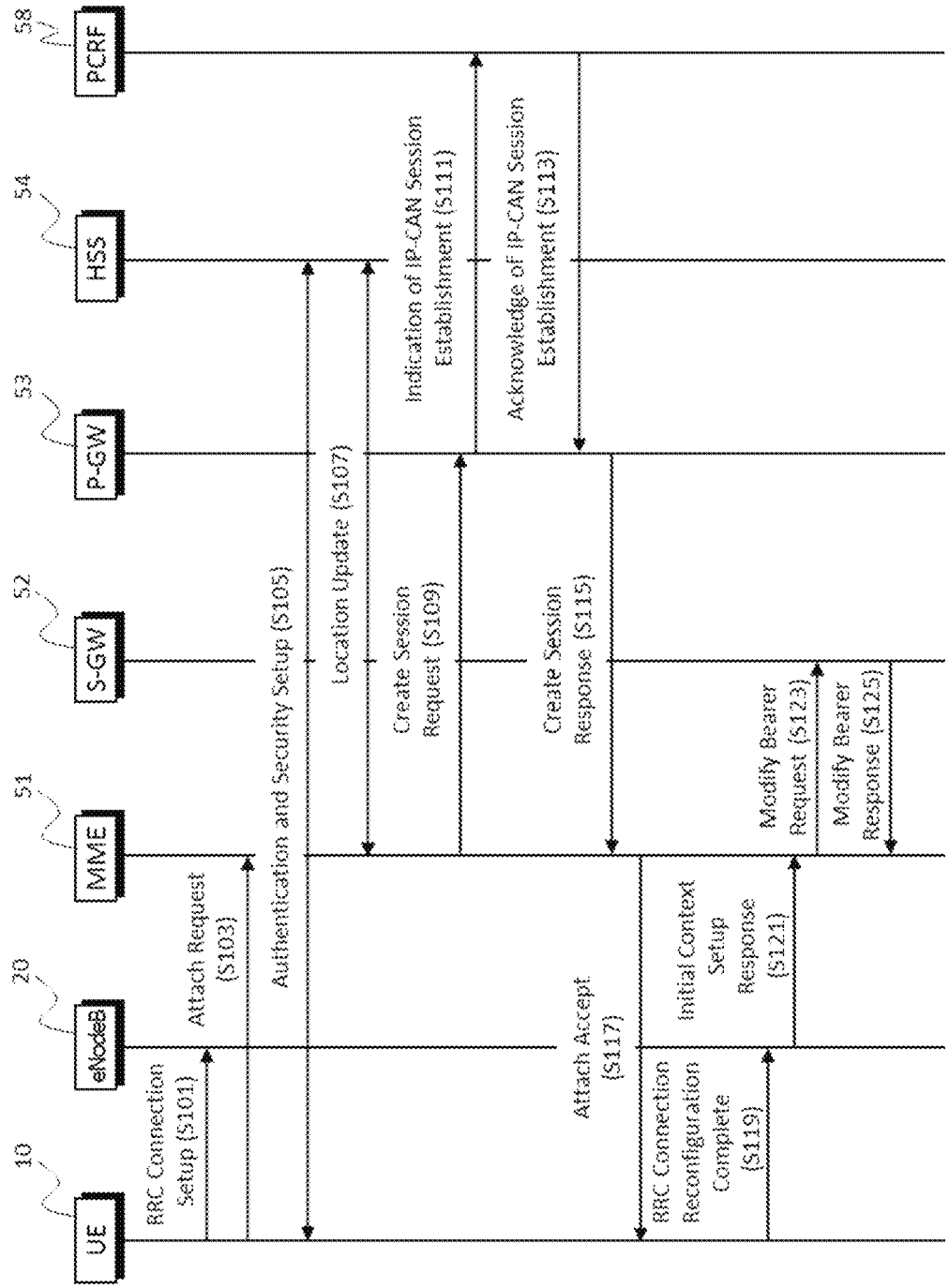
FIG. 7 is an exemplary signal flow diagram showing an initial access procedure of a UE.
Figure 8:
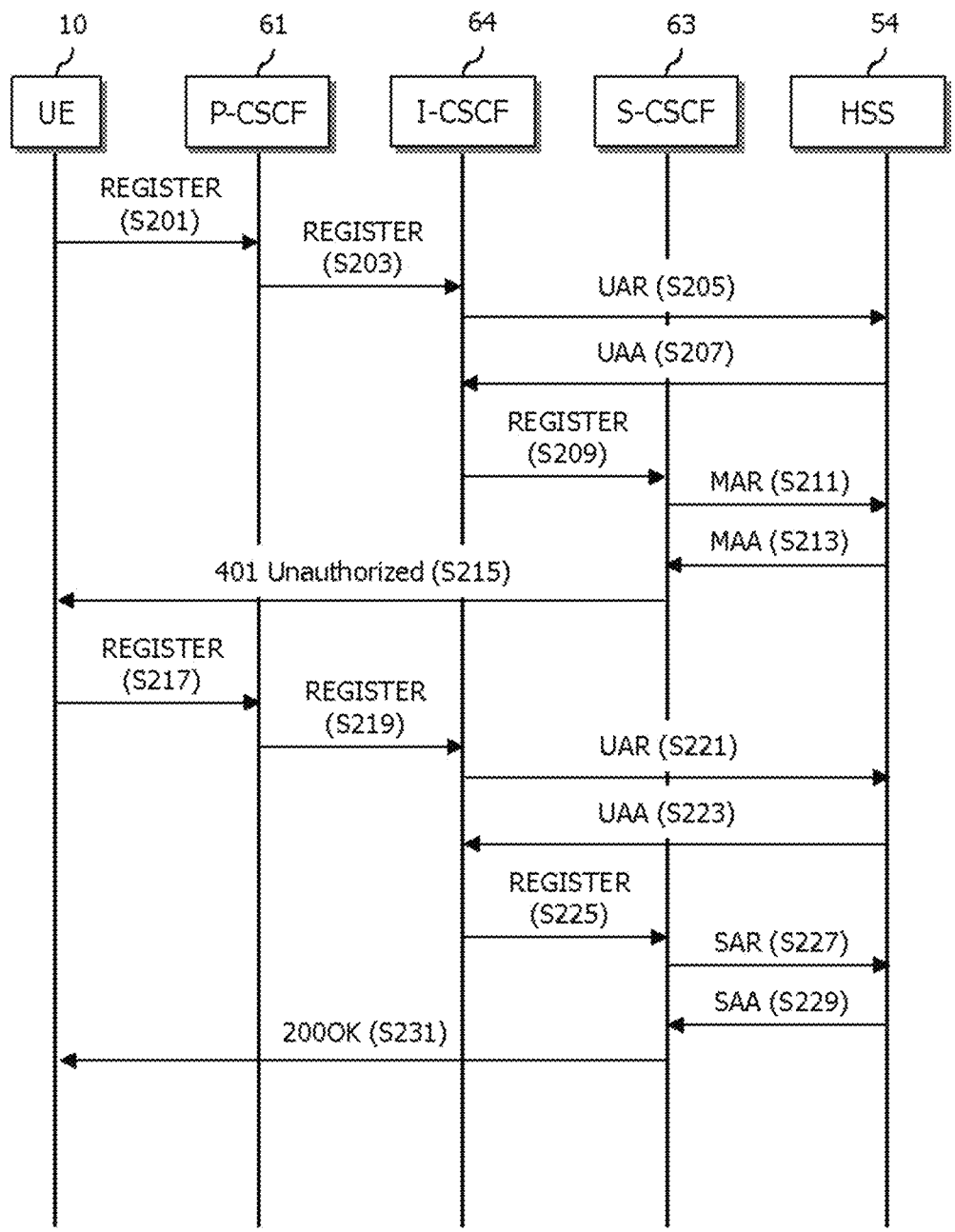
FIG. 8 is an exemplary signal flow diagram showing an IMS initial registration procedure.
Figure 9:
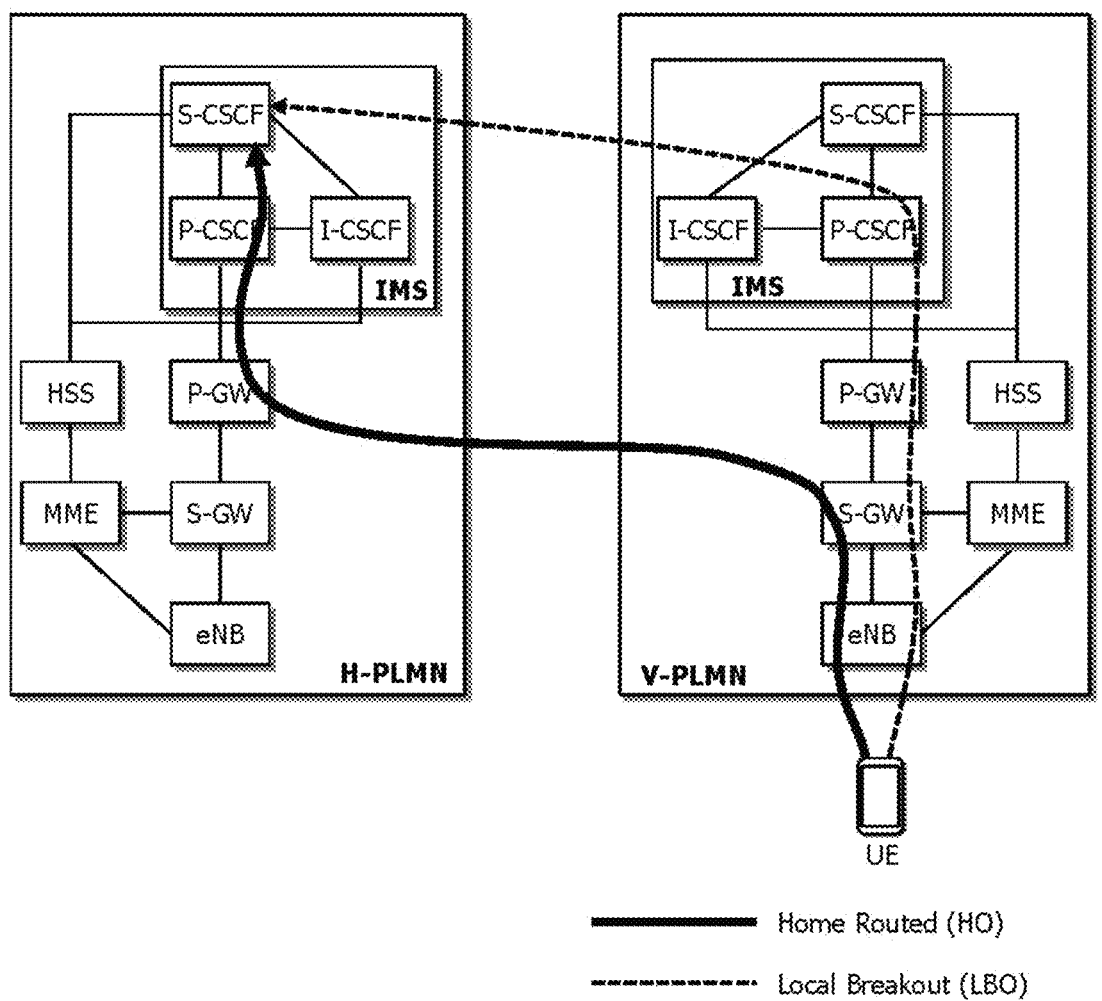
FIG. 9 is an exemplary diagram showing a roaming scheme of voice over LTE (VoLTE).
Figure 10:
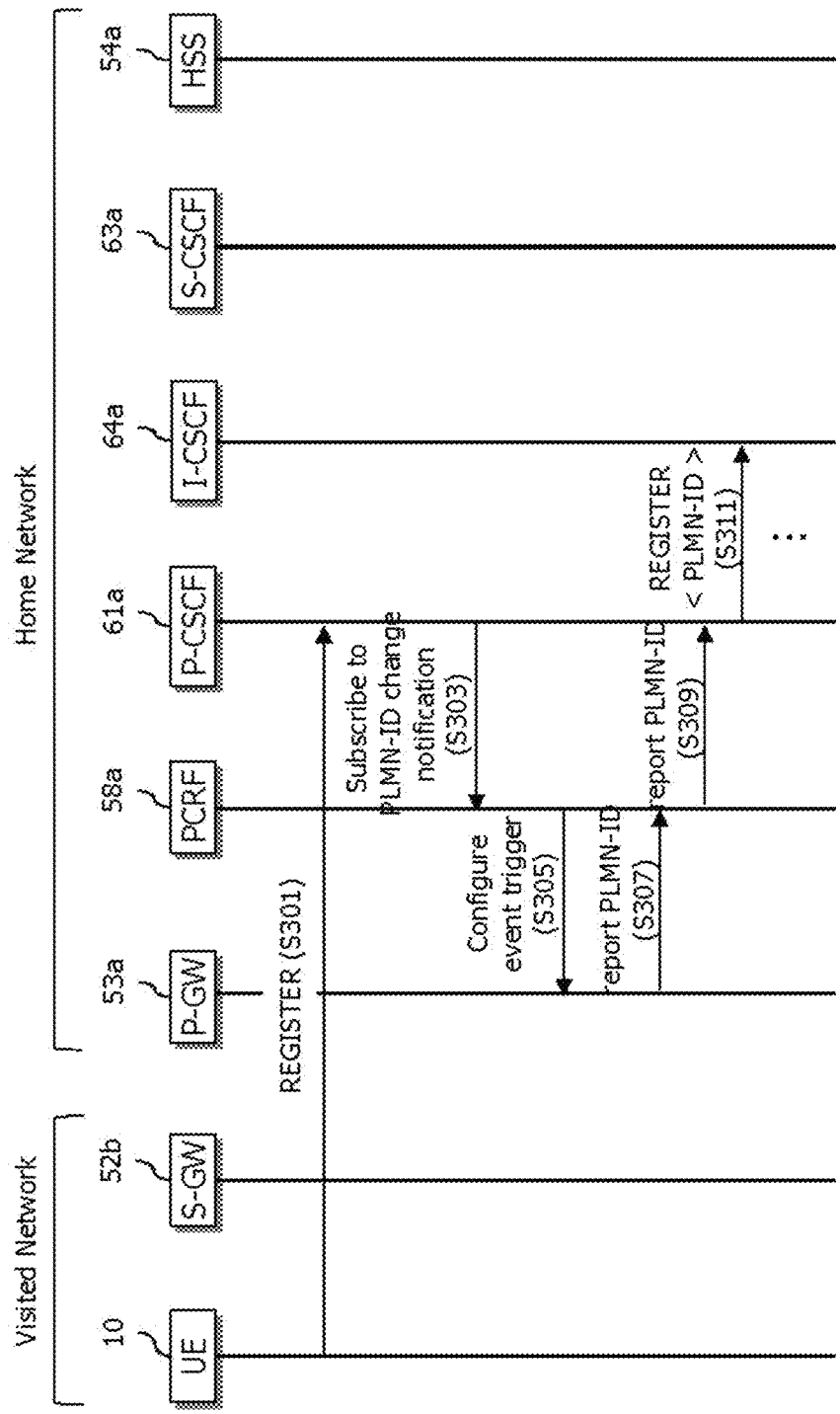
FIG. 10 is an exemplary signal flow diagram showing an IMS registration procedure of a UE roamed to a visited network through an HR scheme.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Meanwhile, an embodiment proposed hereinafter may be implemented alone, or may be implemented by combining several embodiments.

<Disclosure of the Present Specification>

The present specification proposes a method which allows IMS entities of a home network to effectively acquire a PLMN-ID of a visited network in a state where a UE is roamed based on an HR scheme.

1. First scheme for acquiring a PLMN-ID of a visited network in a PDN connection establishment procedure according to a disclosure of the present specification Before an IMS registration procedure is performed, if an event trigger is configured for a PLMN-ID change in a process of performing PDN connection establishment, a P-GW reports a PLMN change to a PCRF. That is, the PLMN change from a home network (H-PLMN) to a visited network (V-PLMN) may be reported in the PDN connection establishment procedure.

Therefore, as a preliminary preparation for reporting the PLMN-ID of the visited network during the IMS registration procedure, the P-GW or the PCRF may store the PLMN-ID of the visited network in advance. That is, the P-GW or the PCRF may preliminarily store the PLMN-ID of the visited network in advance in the PDN connection establishment procedure in a state where there is no notification subscription for the PLMN-ID change from the P-CSCF.

More specifically, the P-GW or the PCRF may determine whether to store the PLMN-ID of the visited network in the PDN connection establishment procedure on the basis of the following conditions.

1) Whether a PDN connection is established based on an HR roaming scheme using an S8 interface.

2) Whether information of a serving network for the UE is different from information of a home network on which the P-GW or the PCRF is located.

3) PLMN-ID information of the visited network is transmitted by a roaming agreement between operators.

The P-GW or the PCRF stores the PLMN-ID of the visited network when a combination of one or more of the aforementioned conditions is satisfied in the PDN connection establishment procedure.

2. Second scheme for providing a PLMN-ID of a visited network before an IMS registration request After an IMS PDN connection is established, there is a high possibility that IMS registration or session initialization will start even if there is no IMS registration request from a UE. Therefore, a P-GW or a PCRF may provide a P-CSCF with a visited network's PLMN-ID stored by the aforementioned first scheme.

Figure 11:
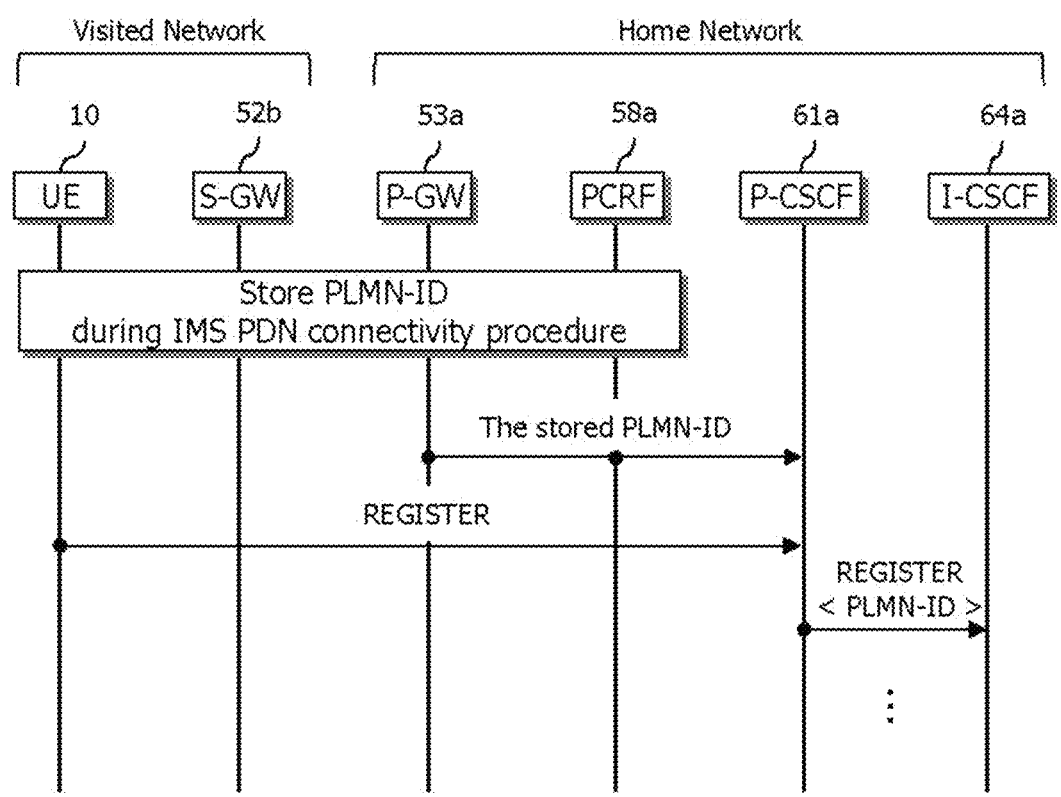
FIG. 11 is a signal flow diagram showing a scheme of providing a PLMN-ID of a visited network before an IMS registration request.

FIG. 11 is a signal flow diagram showing a scheme of providing a PLMN-ID of a visited network before an IMS registration request.

Referring to FIG. 11, a P-GW or a PCRF stores a PLMN-ID of a visited network in an IMS PDN connection procedure. After the IMS PDN connection is established, the P-GW or the PCRF determines that an IMS registration request will start soon, and transmits the stored PLMN-ID of the visited network to the P-CSCF in advance.

The P-GW may transmit the PLMN-ID of the visited network directly to the P-CSCF, or may transmit it to the P-CSCF via the PCRF.

Specifically, if the PLMN-ID of the visited network is transmitted directly to the P-CSCF, the P-GW may transmit the PLMN-ID directly to the P-CSCF by using an SGi interface. In this case, the P-GW may generate a dummy IP packet for delivering network control information instead of data transmitted by the UE, and may transmit the PLMN-ID of the visited network through the generated dummy IP packet.

Unlike this, if the PLMN-ID of the visited network is transmitted to the P-CSCF via the PCRF, the P-GW transmits the PLMN-ID of the visited network to the PCRF similarly to the conventional PLMN-ID report. However, a process in which the PCRF delivers the PLMN-ID of the visited network to the P-CSCF may be newly defined. For example, the PCRF may deliver the PLMN-ID to the P-CSCF through a new message defined on an Rx interface. Alternatively, the PCRF may deliver the PLMN-ID to the P-CSCF by utilizing the existing message of the Rx interface.

Meanwhile, according to the conventional IMS PDN connection procedure, if the P-GW transmits a list for available P-CSCFs to the UE, the UE transmits an IMS control signal by selecting one P-CSCF from the received list. Therefore, the P-GW cannot know a specific P-CSCF to which the PLMN-ID of the visited network is transmitted.

Therefore, the P-GW according to a disclosure of the present specification may determine an address of the P-CSCF which will transmit the PLMN-ID of the visited network by using any one of the following methods.

1) If it is recognized that a PDN connection is established based on an HR roaming scheme in the IMS PDN connection procedure, the P-GW selects one P-CSCF from the P-CSCF list, and transmits only an address of the selected P-CSCF to the UE. In addition, the P-GW remembers the address of the selected P-CSCF.

2) The P-CSCF to be used in the PDN of the HR roaming scheme is pre-configured, and the P-GW transmits to the UE only an address of the P-CSCF pre-configured in the IMS PDN connection procedure.

Meanwhile, the PCRF may provide the P-CSCF with the PLMN-ID of the visited network irrespective of a request of the P-GW.

Specifically, if the PLMN-ID of the visited network has already been acquired by a report of an event trigger for a PLMN-ID change in the IMS PDN connection establishment procedure, the PCRF may transmit the P-CSCF with the PLMN-ID of the visited network irrespective of the request of the P-GW.

The second scheme described up to now may be performed whenever the PLMN is changed. In particular, the second scheme may also be applied to a case where the PLMN is changed after IMS registration. That is, if the PLMN is changed after the IMS registration, the P-GW or the PCRF may determine that an IMS session request message will be received soon, and may transmit the changed PLMN-ID to the P-CSCF in advance.

3. Third scheme for providing a PLMN-ID of a visited network at an IMS registration request Upon recognizing an IMS registration request from a UE, a P-GW or a PCRF may provide a P-CSCF with a visited network's PLMN-ID stored by the aforementioned first scheme even if there is no notification subscription for a PLMN-ID change from the P-CSCF.

Figure 12:
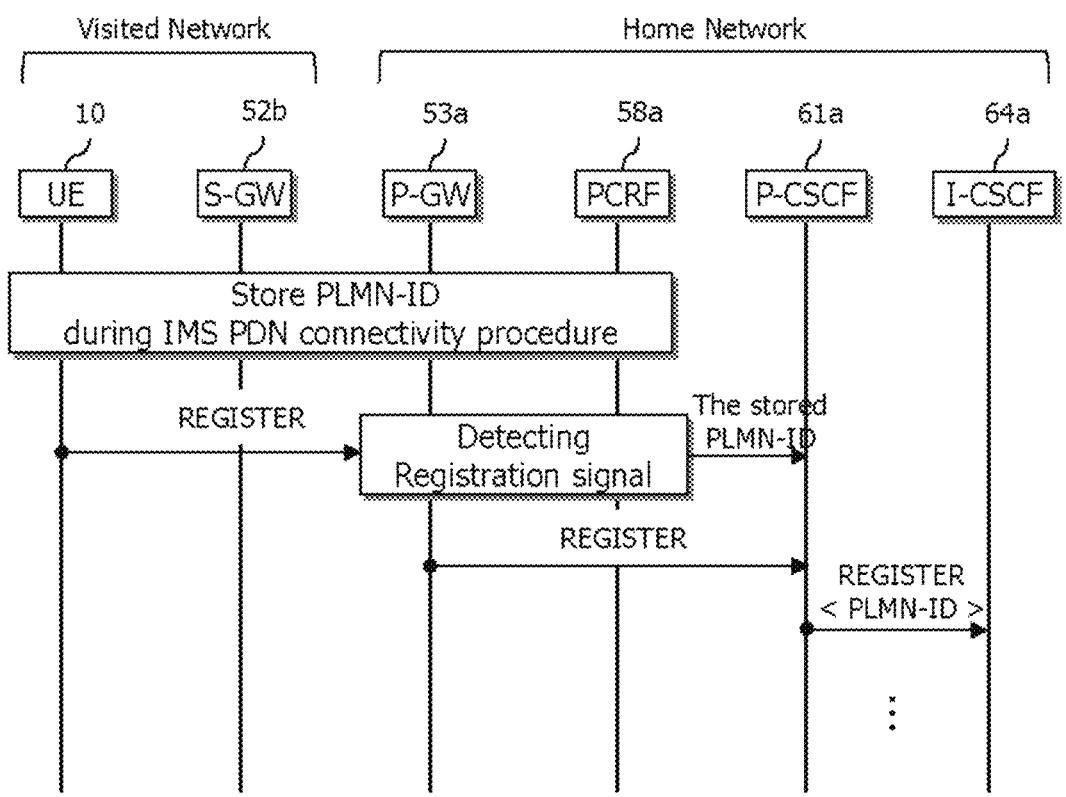
FIG. 12 is a signal flow diagram showing a scheme of providing a PLMN-ID of a visited network at an IMS registration request.

FIG. 12 is a signal flow diagram showing a scheme of providing a PLMN-ID of a visited network at an IMS registration request.

Referring to FIG. 12, a P-GW or a PCRF stores a PLMN-ID of a visited network in an IMS PDN connection procedure. If the UE transmits to a P-CSCF a register message for an IMS registration request, the P-GW or the PCRF recognizes the IMS registration request from the UE, and transmits to the P-CSCF the stored PLMN-ID of the visited network in advance. Specifically, after the IMS PDN connection, upon identifying data transmission through a QoS class identifier-5 (QCI-5) by which an IMS control signal is exchanged, the P-GW or the PCRF may determine that the UE will transmit the register message for the IMS registration request.

The P-GW may transmit the PLMN-ID of the visited network directly to the P-CSCF, or may transmit it to the P-CSCF via the PCRF.

The P-GW may determine an address of the P-CSCF which will transmit the PLMN-ID of the visited network by using any one of the following methods.

1) If it is recognized that a PDN connection is established based on an HR roaming scheme in the IMS PDN connection procedure, the P-GW selects one P-CSCF from the P-CSCF list, and transmits only an address of the selected P-CSCF to the UE. In addition, the P-GW remembers the address of the selected P-CSCF.

2) The P-CSCF to be used in the PDN of the HR roaming scheme is pre-configured, and the P-GW transmits to the UE only an address of the P-CSCF pre-configured in the IMS PDN connection procedure.

3) In a process in which the UE routes to the P-CSCF a register message transmitted for an IMS registration request, the P-GW may recognize an address of the P-CSCF.

The P-GW may transmit to the P-CSCF the PLMN-ID of the visited network according to any one of the following methods.

1) When conforming to the HR roaming scheme, an IMS registration request signal from the UE is delivered to the P-CSCF via the P-GW. Therefore, the P-GW may delay the IMS registration request signal transmitted from the UE, and may first transmit to the P-CSCF a dummy IP packet including the PLMN-ID of the visited network.

2) The P-GW allows a part of an IP header of the IMS registration request signal transmitted from the UE to include an indicator for a transmission scheme of the PLMN-ID, and transmits it to the P-CSCF. That is, the P-GW may inform the P-CSCF that a PLMN-ID related to a corresponding IMS registration request will be transmitted through an additional message by using the IP header of the IMS registration request signal. In addition, the P-GW may allow the dummy IP packet to include the PLMN-ID of the visited network and may transmit it to the P-CSCF. In this case, the P-CSCF may extract the PLMN-ID from the received dummy IP packet on the basis of the indicator included in the IP header of the IMS registration request signal. Unlike this, the P-GW may transmit to the P-CSCF the PLMN-ID of the visited network by using a control signal which is received via the PCRF.

Meanwhile, if it is recognized that the PLMN-ID will be transmitted through an additional message (e.g., the dummy packet or the control signal received via the PCRF on the basis of the indicator), the P-CSCF may delay transmission of an IMS registration request message for the I-CSCF until the PLMN-ID is extracted from the additional message. That is, if the additional message including the PLMN-ID is not yet received, the P-CSCF may delay transmission of the IMS registration request message until the additional message is received to extract the PLMN-ID.

The aforementioned methods 1) and 2) are methods for synchronizing the IMS registration request signal received in the P-CSCF and the PLMN-ID of the visited network to each other when the IMS registration request signal and the PLMN-ID of the visited network are individually received. That is, when not conforming to the aforementioned methods 1) and 2), an additional synchronization signal may be required to synchronize the IMS registration request signal in the P-CSCF and the PLMN-ID of the visited network.

3) The P-GW may add the PLMN-ID of the visited network to the IMS registration request signal transmitted from the UE and may transmit it to the P-CSCF. In this case, the P-GW may add the PLMN-ID of the visited network to an IP header of the IMS registration request message. Specifically, the P-GW may add the PLMN-ID of the visited network to an IPv6 new header or an IPv4 option field of the IMS registration request message.

Meanwhile, if the PLMN is changed after the IMS registration procedure is performed based on any one of the aforementioned schemes, an HSS may recognize that the PLMN is changed by a tracking area update (TAU) procedure or the like. Therefore, a new procedure may be defined in which the HSS informs the P-CSCF of the PLMN change via the S-CSCF and the I-CSCF. When conforming to the new procedure, it is possible to solve a problem in that the IMS entity uses an incorrect PLMN-ID even if the PLMN-ID of the visited network at IMS registration is different from the PLMN-ID of the visited network at the IMS session request.

In particular, if the P-CSCF transmits an IMS signal based on the previous PLMN-ID to the S-CSCF or the I-CSCF before new PLMN-ID information is updated to the P-CSCF, the S-CSCF or the I-CSCF may recognize whether the PLMN-ID of the IMS signal received from the P-CSCF is incorrect on the basis of information received from the HSS.

However, if the HSS informs the PLMN change whenever the PLMN is changed, system signaling may be significantly increased. Therefore, the HSS may be configured to report the PLMN change only in a situation where the UE is roamed based on an HR roaming scheme. In this case, the HSS may determine whether it is a situation where the UE is roamed based on the HR roaming scheme by comparing home network information and information of a network which is currently serving the UE and by identifying a roaming policy of an operator.

Figure 13:
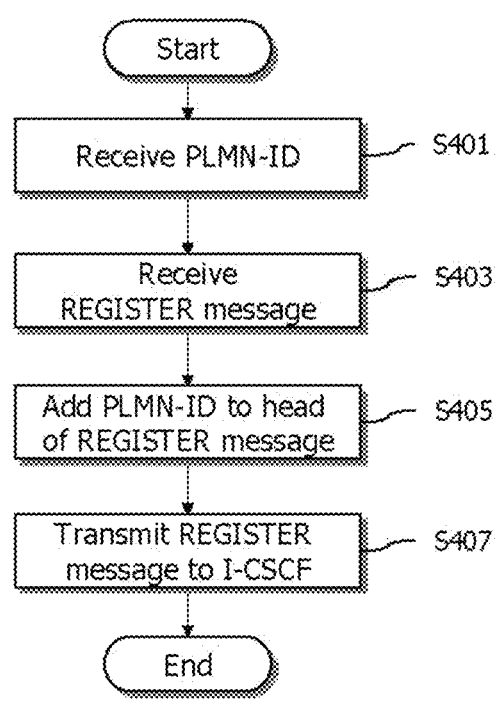
FIG. 13 is a flowchart showing a method of acquiring a PLMN-ID according to a disclosure of the present specification.

FIG. 13 is a flowchart showing a method of acquiring a PLMN-ID according to a disclosure of the present specification.

Referring to FIG. 13, in a state where a PDN connection is established for a UE but the UE is not yet registered to an IMS network, a P-CSCF receives from a P-GW or a PCRF a PLMN-ID of a visited network to which the UE is currently roamed (S401).

Specifically, the UE may be roaming based on an HR scheme using an S8 interface. In addition, the P-CSCF may receive a dummy IP packet from the P-GW, and may extract the PLMN-ID of the visited network from the received dummy IP packet. Alternatively, the P-CSCF may use an Rx reference point to receive the PLMN-ID of the visited network from the PCRF.

Herein, the PLMN-ID of the visited network may be transmitted from the P-GW or the PCRF before the UE transmits the register message. Alternatively, the PLMN-ID of the visited network may be received prior to the register message by the P-GW in a process in which the register message transmitted by the UE passes through the P-GW. Therefore, the PLMN-ID is an identifier of a visited network which serves the UE at a time when a PDN connection is established. When it is determined that the register message is transmitted through a default bearer of the PDN connection, the P-GW may delay transmission of the register message, and may transmit an identifier of a V-PLMN in advance.

Upon receiving the register message from the UE (S403), the P-CSCF adds the PLMN-ID of the visited network to a header of the received register message (S405). If the PLMN-ID of the visited network is transmitted by being included in a dummy IP packet and if an indicator for a transmission scheme thereof is transmitted by being included in the header of the register message, the P-CSCF may extract the PLMN-ID of the visited network from the dummy IP packet or a control signal received via the PCRF on the basis of the indicator included in the header of the register message, and may add the extracted PLMN-ID to the header of the register message.

Meanwhile, if it is recognized that the PLMN-ID will be transmitted through an additional message (e.g., the dummy packet or the control signal received via the PCRF on the basis of the indicator), the P-CSCF may delay transmission of an IMS registration request message for the I-CSCF until the PLMN-ID is extracted from the additional message. That is, if the additional message including the PLMN-ID is not yet received, the P-CSCF may delay transmission of the IMS registration request message until the additional message is received to extract the PLMN-ID.

In addition, the P-CSCF transmits to the I-CSCF the register message to which the PLMN-ID of the visited network is added (S407).

The aforementioned embodiments of the present invention can be implemented through various means. For example, the embodiments of the present invention can be implemented in hardware, firmware, software, combination of them, etc.

Figure 14:
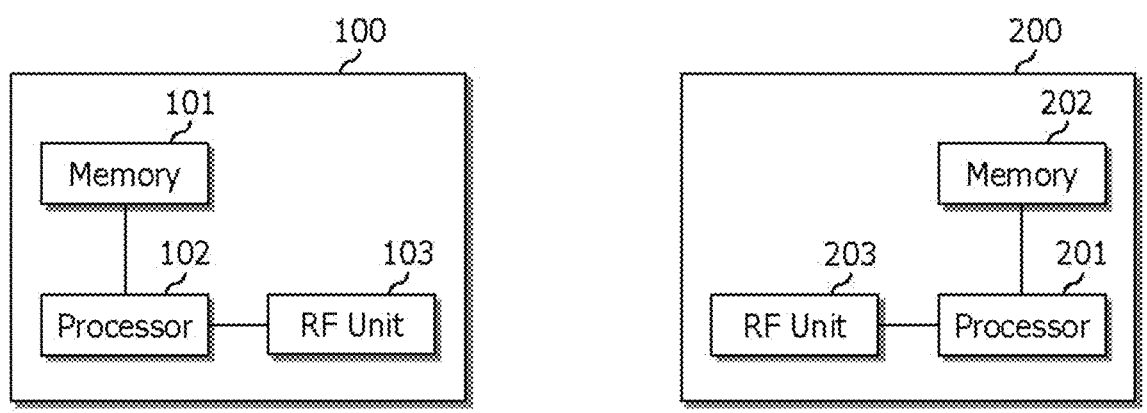
FIG. 14 is a block diagram showing a structure of a UE and a P-CSCF according to a disclosure of the present specification.

FIG. 14 is a block diagram showing a structure of a UE and a P-CSCF according to a disclosure of the present specification.

The UE 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The P-CSCF 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method in which a proxy-call session control function (P-CSCF) of a home public land mobile network (H-PLMN) registers a roaming user equipment to an IP multimedia subsystem (IMS) network, the method comprising:
   receiving, by the P-CSCF, an identifier of a visited public land mobile network (V-PLMN) to which the user equipment is roaming,
   wherein the identifier of the V-PLMN is received after a packet data network (PDN) connection for the user equipment is established but before receiving the register message for registration to the IMS network;
   receiving, by the P-CSCF, the register message for registration to the IMS network from the user equipment, after receiving the identifier of the V-PLMN;
   adding, by the P-CSCF, the identifier of the V-PLMN to a header of the register message; and
   transmitting the register message, to which the identifier of the V-PLMN is added, to an interrogating-CSCF (I-CSCF).

2. The method of claim 1, wherein the receiving of the identifier of the V-PLMN comprises:
   receiving, by the P-CSCF, a dummy IP packet from a PDN-gateway (P-GW); and
   extracting, by the P-CSCF, the identifier of the V-PLMN from the dummy IP packet.

3. The method of claim 1, wherein the receiving of the identifier of the V-PLMN comprises receiving, by a policy and charging rule function (PCRF), the identifier of the V-PLMN from the PCRF by using an Rx reference point for transmitting/receiving a signal between the P-CSRF and the PCRF.

4. The method of claim 1, wherein the identifier of the V-PLMN is received prior to the register message by a PDN-gateway (P-GW) in a process in which the register message transmitted from the user equipment is received via the P-GW.

5. The method of claim 4, wherein when it is determined that the register message is transmitted through a default bearer of the PDN connection, the P-GW delays transmission of the register message, and transmits an identifier of a V-PLMN in advance.

6. The method of claim 1, wherein the identifier of the V-PLMN is transmitted by being comprised in a dummy IP packet,
   wherein an indicator for a transmission scheme of the identification of the V-PLMN is comprised in the header of the register message, and
   wherein in the adding of the identifier of the V-PLMN to the header of the register message, the identifier of the V-PLMN is extracted from the dummy IP packet based on the indicator, and the extracted identifier of the V-PLMN is added to the header of the register message.

7. The method of claim 1, wherein the identifier of the V-PLMN is an identifier for a V-PLMN which is serving the user equipment at a time when the PDN connection is established.

8. The method of claim 1, wherein the user equipment is roaming to the V-PLMN based on a home routed (HR) scheme by using an S8 reference point for transmitting/receiving a signal between a serving-gateway (S-GW) of the V-PLMN and a PDN-gateway (P-GW) of the H-PLMND.

9. A proxy-call session control function (P-CSCF) of a home public land mobile network (H-PLMN) for registering a roaming user equipment to an IP multimedia subsystem (IMS) network, the P-CSCF comprising:
   a transceiver; and
   a processor controlling the transceiver, wherein the processor is configured to:
   control the transceiver to receive an identifier of a visited public land mobile network (V-PLMN) to which the user equipment is roaming, wherein the identifier of the V-PLMN is received after a packet data network (PDN) connection for the user equipment is established but before receiving the register message for registration to the IMS network;
   control the transceiver to receive a register message for registration to the IMS network from the user equipment, after receiving the identifier of the V-PLMN;
   add the identifier of the V-PLMN to a header of the register message; and
   control the transceiver to transmit the register message, to which the identifier of the V-PLMN is added, to an interrogating-CSCF (I-CSCF).

10. The P-CSCF of claim 9, wherein the processor is configured to:
    control the transceiver to receive a dummy IP packet from a PDN-gateway (P-GW); and
    perform a procedure of extracting the identifier of the V-PLMN from the dummy IP packet.

11. The P-CSCF of claim 9, wherein the processor receives the identifier of the V-PLMN from a policy and charging rule function (PCRF) by using an Rx reference point for transmitting/receiving a signal between the P-CSRF and the PCRF.

12. The P-CSCF of claim 9, wherein the identifier of the V-PLMN is received prior to the register message by a PDN-gateway (P-GW) in a process in which the register message transmitted from the user equipment is received via the P-GW.

13. The P-CSCF of claim 12, wherein when it is determined that the register message is transmitted through a default bearer of the PDN connection, the P-GW delays transmission of the register message, and transmits an identifier of a V-PLMN in advance.

14. The P-CSCF of claim 12, wherein the identifier of the V-PLMN is transmitted by being comprised in a dummy IP packet,
    wherein an indicator for a transmission scheme of the identification of the V-PLMN is comprised in the header of the register message, and
    wherein the processor extracts the identifier of the V-PLMN from the dummy IP packet based on the indicator, and adds the extracted identifier of the V-PLMN to the header of the register message.

15. The P-CSCF of claim 9, wherein the identifier of the V-PLMN is an identifier for a V-PLMN which is serving the user equipment at a time when the PDN connection is established.

16. The P-CSCF of claim 9, wherein the user equipment is roaming to the V-PLMN based on a home routed (HR) scheme by using an S8 reference point for transmitting/receiving a signal between a serving-gateway (S-GW) of the V-PLMN and a PDN-gateway (P-GW) of the H-PLMND.

* * * * *